(12) United States Patent
Lee et al.

(10) Patent No.: US 10,750,319 B2
(45) Date of Patent: Aug. 18, 2020

(54) TECHNIQUES FOR LOCATION STATE DETERMINATION BY AN ELECTRONIC DEVICE

(71) Applicant: TOTL LLC, San Francisco, CA (US)

(72) Inventors: John Stewart Lee, Berkeley, CA (US); Peter John Cockerell, Palo Alto, CA (US)

(*) Notice: Subject to any disclaimer, the term of this patent is extended or adjusted under 35 U.S.C. 154(b) by 0 days.

(21) Appl. No.: 16/298,929

(22) Filed: Mar. 11, 2019

(65) Prior Publication Data
US 2019/0313206 A1    Oct. 10, 2019

Related U.S. Application Data

(60) Provisional application No. 62/641,470, filed on Mar. 12, 2018.

(51) Int. Cl.
*H04W 4/02* (2018.01)
*H04W 4/029* (2018.01)

(52) U.S. Cl.
CPC .......... *H04W 4/023* (2013.01); *H04W 4/026* (2013.01); *H04W 4/027* (2013.01); *H04W 4/029* (2018.02)

(58) Field of Classification Search
CPC ..... H04W 4/023; H04W 4/029; H04W 4/026; H04W 4/027
USPC ........ 455/456.3, 456.1, 410, 411, 432.1, 436
See application file for complete search history.

(56) References Cited

U.S. PATENT DOCUMENTS

2015/0024787 A1* 1/2015 Ben-Itzhak ........... H04W 4/029
  455/456.4
2017/0148243 A1* 5/2017 Shin .................... G07C 9/00563

* cited by examiner

*Primary Examiner* — Nghi H Ly
(74) *Attorney, Agent, or Firm* — Ali Sharifzadeh

(57) ABSTRACT

The present disclosure provides for dynamically determining locations of an electronic device. For example, the electronic device may determine a location state transition condition using one or both of a location measurement or an activity status of the electronic device. The electronic device may further determine whether the location state transition condition satisfies a location state transition threshold triggering an entry or exit to or from a first location state. The electronic device may further transition from the first location state to a second location state different from the first location state based on a determination that the location state transition condition satisfies the location state transition threshold.

14 Claims, 7 Drawing Sheets

TECHNIQUES FOR LOCATION STATE DETERMINATION BY AN ELECTRONIC DEVICE

RELATED APPLICATION(S)

This application claims the benefit of U.S. Provisional Application Ser. No. U.S. Application No. 62/641,470 entitled "TECHNIQUES FOR LOCATION STATE DETERMINATION BY AN ELECTRONIC DEVICE" filed Mar. 12, 2018, which is expressly incorporated by reference herein in its entirety.

BACKGROUND

The present disclosure relates to electronic devices, and more particularly, to dynamic location state determination of an electronic device based on location and activity events.

Use of computing or electronic devices is becoming more ubiquitous by the day. Electronic devices range from standard desktop computers to mobile and/or wearable computing technology and beyond. In the case of mobile electronic devices, various applications and mobile services use location information for improving user experience. For example, location information of the mobile electronic device may be used as part of communicating with a base station. In another example, an application residing at the mobile electronic device may use location information to verify an identity of a user. Thus, location information as obtained by or via mobile electronic devices may be used for a wide variety of services.

However, one problem with such devices is the inaccuracy and unreliability of location information during some scenarios. For example, in some instances, mobile electronic devices may be enter an out-of-service state where cellular, wireless wide area network (WWAN) service, and/or wireless local area network (WLAN) service is lost. Further, even in normal operating cases where mobile electronic devices have or maintain wireless service or connection, the mobile electronic devices fail to use such information to deduce various user habits and/or location-specific behaviors.

Thus, there is a need in the art for improvements in location state determination at an electronic device.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its purpose is to present some concepts of one or more implementations in a simplified form as a prelude to the more detailed description that is presented later.

In one example, a method of location state determination comprising at an electronic device including one or more sensors and at least one application module. The method includes receiving at least one of a location measurement from the one or more sensors or an activity status of the electronic device from the at least one application module. The method further includes determining a location state transition condition using one or both of the location measurement or the activity status of the electronic device. The method further includes determining whether the location state transition condition satisfies a location state transition threshold triggering an entry or exit to or from a first location state. The method further includes transitioning from the first location state to a second location state different from the first location state based on a determination that the location state transition condition satisfies the location state transition threshold. The method further includes maintaining the first location state based on a determination that the location state transition condition does not satisfy the location state transition threshold.

In another example, an electronic device for location state determination comprises a memory configured to store data and instructions, at least one sensor configured to obtain one or more location measurements, and at least one processor in communication with the memory and the at least one sensor. The at least one processor is configured to receive at least one of a location measurement from the at least one sensor or an activity status of the electronic device from the at least one application module. The at least one processor is further configured to determine a location state transition condition using one or both of the location measurement or the activity status of the electronic device. The at least one processor is further configured to determine whether the location state transition condition satisfies a location state transition threshold triggering an entry or exit to or from a first location state. The at least one processor is further configured to transition from the first location state to a second location state different from the first location state based on a determination that the location state transition condition satisfies the location state transition threshold. The at least one processor is further configured to maintain the first location state based on a determination that the location state transition condition does not satisfy the location state transition threshold.

In a further example, a computer-readable medium storing instructions executable by an electronic device for location state determination. The computer-readable medium includes at least one instruction for receiving at least one of a location measurement from at least one sensor or an activity status of the electronic device from the at least one application module. The computer-readable medium further includes at least one instruction for determining a location state transition condition using one or both of the location measurement or the activity status of the electronic device. The computer-readable medium further includes at least one instruction for determining whether the location state transition condition satisfies a location state transition threshold triggering an entry or exit to or from a first location state. The computer-readable medium further includes at least one instruction for transitioning from the first location state to a second location state different from the first location state based on a determination that the location state transition condition satisfies the location state transition threshold. The computer-readable medium further includes at least one instruction for maintaining the first location state based on a determination that the location state transition condition does not satisfy the location state transition threshold.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The specific features, implementations, and advantages of the disclosure will become better understood with regard to the following description, appended claims, and accompanying drawings where:

DETAILED DESCRIPTION

Figure 1A:
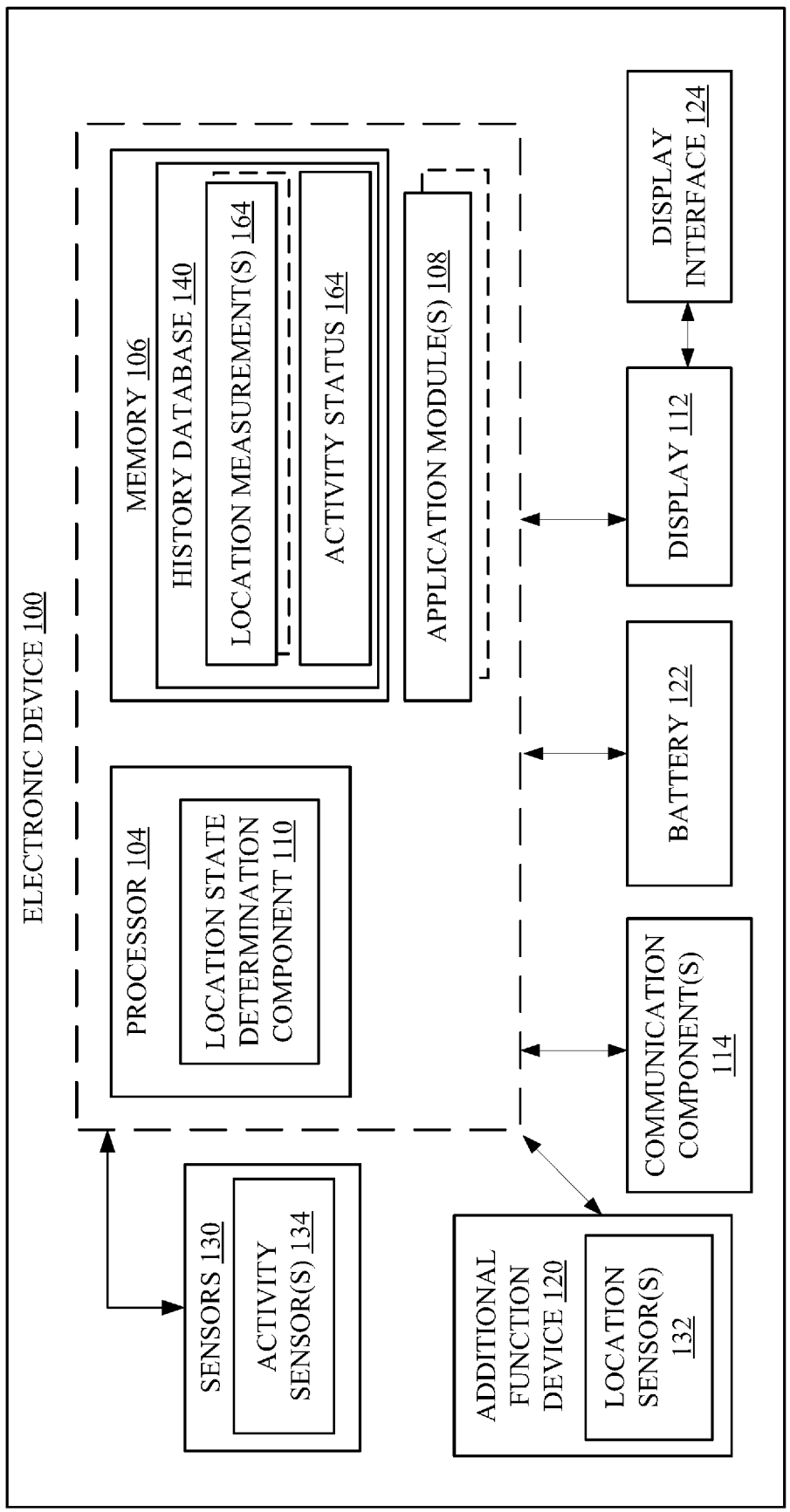
FIG. 1A is a schematic block diagram of an example electronic device including an location state determination component in accordance with some implementations.

The detailed description set forth below in connection to the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In some implementations, examples may be depicted with references to one or more components and one or more methods that may perform the actions or operations described herein, where components and/or actions/operations in dashed line may be optional.

The present disclosure relates to location state determinations at an electronic device. In some implementations, the electronic device may be a mobile device. Specifically, electronic devices may detect a location at a given point in time using at least one onboard or integrated sensor such as a global positioning sensor (GPS). The location information may be used by various applications and/or services for enhancing user experience. For example, location information may be used by an application residing at the electronic device to provide location based services to a user. In a further example, location information may be used for wireless service configurations.

Nonetheless, although location information may be obtained to represent a location of an electronic device at a single point in time, the location information may fail to indicate a state or context of the electronic device. That is, location information is currently limited in only providing an estimated location of the electronic device, for example, as coordinate or triangulation information. Specifically, context or state information indicating a movement status of the electronic device may be lacking in or part of location information. In an example, while location information provides a fairly precise estimate of electronic device location, an indication as to whether the electronic device has departed from, is enroute to, or arrived at particular location is lacking.

For instance, a user of an electronic device may be traveling from a first location to a second location. Location information obtained by the electronic device may provide a particular geographic location at a single point in time without any context or state of the user of the electronic device. In other words, a state indicating a movement status of the electronic device associated with the location may not be unknown. The user of the electronic device may have just departed the first location, may be enroute to the second location, or arrived at the second location, yet the location information fails to provide any indication as such. Thus, it may be desirable to determine location state information to provide a more complete representation of electronic device movement scenarios.

The present implementations provide location state determinations at an electronic device. For example, an electronic device according to the present implementations receive at least one of a location measurement from one or more sensors or an activity status of the electronic device from the at least one application module. The electronic device may further determine a location state transition condition using one or both of the location measurement or the activity status of the electronic device. Moreover, the electronic device may determine whether the location state transition condition satisfies a location state transition threshold triggering an entry or exit to or from a first location state. Additionally, the electronic device may further transition from the first location state to a second location state different from the first location state based on a determination that the location state transition condition satisfies the location state transition threshold. The electronic device may further maintain the first location state based on a determination that the location state transition condition does not satisfy the location state transition threshold.

Figure 1B:
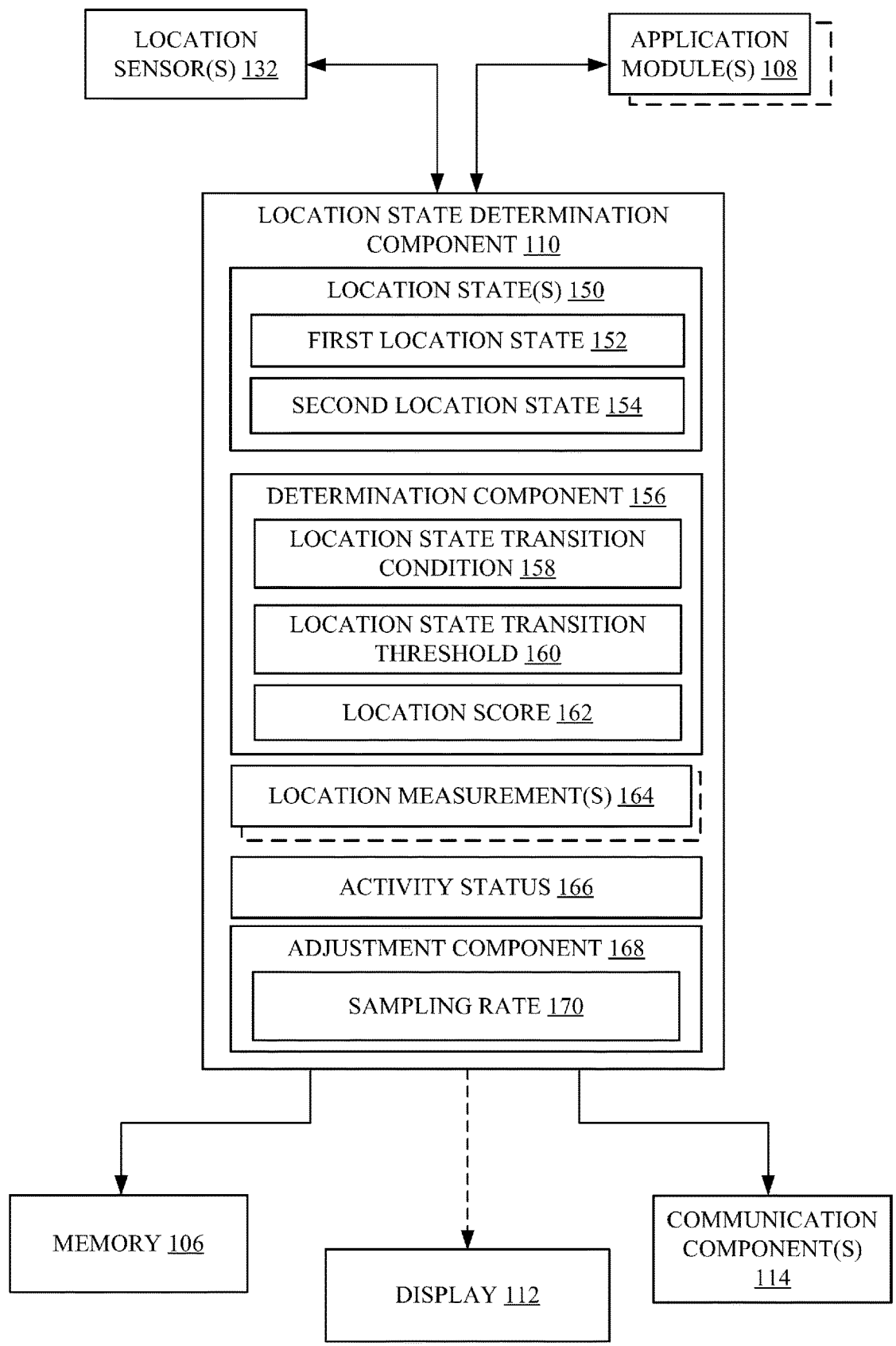
FIG. 1B is a schematic block diagram of the location state determination component and various subcomponents in accordance with some implementations.

Referring now to FIGS. 1A and 1B, an example electronic device 100 may include one or more components and/or subcomponents such as a location state determination component 110 for determining a location state representing a movement status of the electronic device 100. In some implementations, the electronic device 100 may be or otherwise take the form of a mobile device, smart watch, and/or other wearable device. In some implementations, the electronic device 100 may include or may otherwise be coupled with a processor 104 and/or a memory 106, where the processor 104 and/or the memory 106 may be configured to execute or store instructions or other parameters, such as location measurements 164 and/or activity status 166, one or both of which may be maintained in a history database 140.

The electronic device 100 may also include at least one application module 108, which may reside as part of the processor 104, and may determine and provide at least activity status 166 information to the location state determination component 110. Further, for example, the location state determination component 110 may correspond to or be part of an operating system of the electronic device 100 (e.g., a mobile operating system) or an application executing on the operating system of the electronic device 100.

In some implementations, the electronic device 100 may also include a display 112 having a presentation area, such as a screen, for presenting one or more graphical interfaces (e.g., graphical user interfaces (GUI)), such as to provide information for consumption by a user wearing the electronic device 100. For example, the display 112 may be or may include a liquid crystal display (LCD), light emitting diode (LED), organic LED (OLED), high-contrast electronic ink (E-Ink), a fabric including light pipes, or a micro-LED array, and may display graphical interfaces as instructed by processor 104 (e.g., based on execution of the location state determination component 110).

The electronic device 100 may also include a display interface 124 that couples to display 112 to provide instructions, parameters, or signals, for example, for displaying the graphical interfaces. In some implementations, the display 112 and/or the display interface 124 may form a touch-sensitive display that may detect touch inputs on the display 112 (e.g., for interacting with a user interface) and also output data in the form of graphical representations (e.g., on the user interface).

In some implementations, the electronic device 100 may also include one or more communication component(s) 114 for communicating with another device via a wired or wireless interface (Bluetooth, radio frequency identification (RFID), near field communication (NFC)). The electronic device 100 may also include a battery 122 for providing power to various components and/or subcomponents of the electronic device 100.

The electronic device 100 may also include one or more sensors 130. In some implementations, the one or more sensors 130 may also include an accelerometer for detecting at least acceleration of the electronic device 100, a gyroscopic sensor for detecting angular velocity of the electronic device 100, an angle or orientation sensor for detecting a position of the electronic device 100 relative to a reference plan, a compass for determining a direction of magnetic north and bearing from it, an ultraviolet (UV) sensor for detecting light in the ultraviolet spectrum, and/or a barometer for measuring atmospheric pressure.

In addition, the electronic device 100 may include one or more additional function devices 120 for providing additional functionality to the electronic device 100. For example, the one or more additional function devices 120 may include location sensors 132 such as, but are not limited to, a global positioning system (GPS) radio, a fitness tracking device (e.g., a step tracking device, a pulse monitor or tracking device, a power meter, or any other type of fitness- or biometric-characteristic tracking device), a battery, a microphone, a galvanic skin sensor, a memory, a processor, or a communication interface, such as an RFID radio, Bluetooth radio, or a Wi-Fi radio.

In some implementations, the electronic device 100 may include an operating system executed by the processor 104 and/or the memory 106 of the electronic device 100. The memory 106 may be configured for storing data and/or computer-executable instructions defining and/or associated with the operating system (and/or firmware), and the processor 104 may execute the operating system and/or one or more associated components such as the location state determination component 110. An example of the memory 106 can include, but is not limited to, a type of memory usable by a computer, such as random access memory (RAM), read only memory (ROM), tapes, magnetic discs, optical discs, volatile memory, non-volatile memory, and any combination thereof. An example of the processor 104 may include, but is not limited to, any processor specially programmed as described herein, including a controller, microcontroller, application specific integrated circuit (ASIC), field programmable gate array (FPGA), system on chip (SoC), or other programmable logic or state machine.

Referring more specifically to FIG. 1B, the location state determination component 110 may be configured to determine and provide a location state 150 of the electronic device 100 based at least on a location measurement 164 obtained or derived from the location sensors 132 and/or the activity status 166 obtained from the application modules 108. In some implementations, the location measurement 164 and the activity status 166 may be referred to as events. For example, over the course a certain time period, a user of the electronic device 100 may travel or move from one location to another. During the course of such travel or movement, location sensor 132 may obtain or derive location measurements 164. However, the location state 150 of the user, or more specifically, of the electronic device 100, at a given point in time may also be determined based at least on the location measurements 164 and/or the activity status 166 to provide a deeper layer or understanding of a user's movements and movement patterns.

In some implementations, the location state 150 may correspond to or otherwise be representative of a movement status of the electronic device 100 at a given point in time. For example, the location state 150 may indicate or otherwise correspond to an unknown state, an arrived state, a departure transition state, an enroute state, and/or an arrival transition state. The unknown state may indicate that the location state 150 of the electronic device 100 is unidentified or undetermined. In some implementations, upon initialization or startup of the electronic device 100 or the location state determination component 110 (e.g., also referred to as a cold start), the location state 150 may be initialized and/or set by default to the unknown state. The cold start may be a first invocation of the location state determination component 110 or one where a persisted state is available to begin with, but the age of the persisted age meets or exceeds an age threshold corresponding to a length of time (e.g., a number of hours).

In some implementations, the persisted state may include or otherwise correspond to one or more of the location state 150, a time the location state 150 was entered, a last arrival place represented as latitude/longitude coordinate information (e.g., referred to as an anchor point), a last location event's coordinate information, an identifier of a last event, and/or a timestamp of last event. In some implementations, an event including the last event may include or otherwise correspond to the location measurement 164 and/or an activity status 166. The arrived state may indicate that the electronic device 100 has arrived at a destination. In some implementations, after a cold start, the location state 150 may transition from the unknown state to the arrived state when a location is available. The departure transition state may indicate that the electronic device 100 is transitioning from an arrived state to an enroute state. The enroute state may indicate that the electronic device 100 is in transit to a destination. The arrival transition state may indicate that the electronic device 100 is transitioning from the enroute state to the arrived state.

The activity status 166 may correspond to one or more of an unknown status, tilting status, walking status, cycling status, and/or driving status as determined by the application module 108 of the electronic device 100 and representative of a user's activity. The location measurement 164 may correspond to one or more of GPS information, coordinate information, instantaneous velocity of the electronic device 100, displacement distance of the electronic device 100 from a first location to a second location, departure velocity of the electronic device 100 from a departure location, and/or geographical data including boundary information. In some implementations, the location measurement 164 may be mapped to the activity status 166 such that each of the GPS information, coordinate information, instantaneous velocity, displacement distance, and departure velocity is mapped to at least one activity status 166.

Specifically, in an example, during operation of the electronic device 100, the location state determination component 110 may receive, at a first time, at least one location measurement 164 from the location sensor 132 and/or the activity status 166 from the application module 108. For instance, the user of the electronic device 100 may begin departing from a first location. In some implementations, the location state determination component 110 may periodically or continuously receive, from the history database 140, the location measurement 164 and/or the activity status 166. Each location measurement 164 and activity status 166 may be associated with a timestamp indicating when the data was captured and/or determined.

In some implementations, the electronic device 100 may be in a first location state 152 during the first time when the location state determination component 110 receives the location measurement 164 and/or the activity status 166. Hence, while the electronic device 100 is in the first location state 152, which may be any one of the unknown state, the arrived state, the departure transition state, the enroute state, and/or the arrival transition state, the electronic device 100 may receive, at a first time, at least one location measurement 164 from the location sensor 132 and/or the activity status 166 from the application module 108. As such, continuing with the above example, the electronic device 100 may be in a first location state 152 when the user begins departing from the first location. In some implementations, the electronic device 100 may not be in any location state 150 during the first time when the location state determination component 110 receives the location measurement 164 and/or the activity status 166.

The location state determination component 110 may be configured to determine a location state transition condition 158 using the location measurement 164 and/or the activity status 166 of the electronic device 100. In some implementations, the location state transition condition 158 may correspond to a location score 162 representing a confidence level of the location state 150 of the electronic device 100 and configured based on a history of at least one location measurement 164 and/or activity status 166. In the above example, as the user of the electronic device 100 departs from the first location, the location state determination component 110 may, while in the first location state 152, determine the location state transition condition 158 associated with the location state 150.

That is, the location state determination component 110 may be in the first location state 152 while determining the location state transition condition 158. Accordingly, the location state determination component 110 may use or execute the location state transition condition 158 specific to the location state 150, or in this example, the first location state 152. Table 1 below outlines a mapping of the location state transition conditions 158 and corresponding location state transition thresholds 160 to the locations states 150, and more specifically, to the location state transition conditions 158 that trigger a transition from the first location state 152 to the second locations 154 upon satisfying the location state transition thresholds 160. In some implementations, the location score 162 may correspond to a time or distance parameter as outlined in Table 1 below.

TABLE 1

Mapping of the location state transition conditions 158 and location state transition thresholds 160 to the location states 150

| Location State 150 (e.g., First Location State 152) | New State (e.g., Second Location State 154) | Location State Transition Condition(s) 158 & Location State Transition Threshold(s) 160 |
| --- | --- | --- |
| Unknown State, Arrival Transition State, or Departure Transition State | Arrived State | arrivalTestScore ≥ ParamArrivalScoreThreshold OR timeInstate > ParamLeaveStateMaxDetectionTimeInSecs AND arrivalTestScore > enrouteTestScore |
|  | Enroute State | enrouteTestScore ≥ ParamEnrouteScoreThreshold OR timeInState > ParamLeaveStateMaxDetectionTimeInSecs AND enrouteTestScore > arrivalTestScore |
| Arrived State | Enroute State | dist > ParamMinArrivedToEnrouteDistanceInMeters where dist = distance between arrival point and latest GPS location |
|  | Departure Transition State | $enrouteTestScore \geq arrivalTestScore * \dfrac{threshold}{100 - threshold}$<br><br>where threshold is the value of ParamArrivedToEnrouteMovingDetectionThresholdPercent (75 by default). Another way to put this is<br><br>$\dfrac{enrouteTestScore}{enrouteTestScore + arrivalTestScore} * 100 \geq threshold$<br><br>This trigger is only tested if there are at least ParamMinArrivedToEnrouteDetectionCount (default 4) events in the event history. |
| Enroute State | Arrival Transition State | $arrivalTestScore \geq enrouteTestScore * \dfrac{threshold}{100 - threshold}$<br><br>where threshold is the value of ParamEnrouteToArrivedStillDetectionThresholdPercent (75 by default). Another way to put this is<br><br>$\dfrac{arrivalTestScore}{enrouteTestScore + arrivalTestScore} * 100 \geq threshold$ |

TABLE 1-continued

Mapping of the location state transition conditions 158 and location state transition thresholds 160 to the location states 150

| Location State 150 (e.g., First Location State 152) | New State (e.g., Second Location State 154) | Location State Transition Condition(s) 158 & Location State Transition Threshold(s) 160 |
|---|---|---|
| | | This trigger is only tested if there are at least ParamMinEnrouteToArrivedDetectionCount (default 4) events in the event history. |

Specifically, the location state determination component 110 may include the determination component 156, which may update or adjust the location score 162 as the location measurements 164 and/or the activity statuses 166 are received. For example, as the electronic device 100 receives the location measurements 164 and/or the activity statuses 166 throughout the course of various movement scenarios or changes in location, the determination component 156 may update the location score 162 according to at least one measurement score or value corresponding to the received location measurements 164 and/or the activity statuses 166. In some implementations, each location measurement 164 and activity status 166 may be associated with a specific or distinct measurement score indicative of a attributable value for triggering a transition of the location state 150.

The location state transition conditions 158 describe above in Table 1 reference 'ArrivalTestScore' and 'EnrouteTestScore', each of which may correspond to the location score 162. These scores may be accumulated as events such as location measurements 164 and/or activity statuses 166 are received and processed, and may also be reset to zero on a change in location state 150. The determination of the location score 162 (e.g., 'ArrivalTestScore' and/or 'EnrouteTestScore') may be dependent on a current location state 150. For example, in some states such as the arrived state or enroute state, the location score 162 may be determined based on a history of recent events (e.g., location measurements 164 and/or activity statuses 166) stored in history database 140.

The history database 140 may have a size limit and/or an age limit for events. As a new event is received, the event may be added to the history database 140 and the location score 162 may be automatically reevaluated or determined. If the addition of the new event will exceed the size limit, the oldest event may be deleted or discarded to make way for the new event. Each event may have or be associated with a measurement score or value, which is an amount the event contributes to the location score 162. In an example referring to the 'ArrivalTestScore' and 'EnrouteTestScore', if the measurement score associated with an event is a positive value, the measurement score may be applied to the 'ArrivalTestScore'. However, if the measurement score associated with the event is a negative value, the measurement score may be applied to the 'EnrouteTestScore'. Table 2 outlines various measurement scores (in parenthesis) for each activity status 166.

TABLE 2

Activity statuses 166 and associated measurement scores

| Activity Status 166 | Measurement Score |
|---|---|
| Unknown | ParamArrivalScoreForUnknownActivity (0) |
| Still | ParamArrivalScoreForStillActivity (2) |

TABLE 2-continued

Activity statuses 166 and associated measurement scores

| Activity Status 166 | Measurement Score |
|---|---|
| Tilting | ParamArrivalScoreForTiltingActivity (1) |
| Walking | −ParamEnrouteScoreForWalkingActivity (−2) |
| Cycling | −ParamEnrouteScoreForCyclingActivity (−8) |
| Driving | −ParamEnrouteScoreForDrivingActivity (−15) |

For location measurements 164, the measurement score may be based on a speed or velocity identified or provided as part of each location measurement 164, if any, mapped to a corresponding activity status 166. For example, Table 3 below provides example measurement scores for the location measurements 164 associated with specific activity statuses 166.

TABLE 3

Measurement scores for location measurements 164

| Activity Status 166 | Measurement score (for speed >= the below location measurement 164) |
|---|---|
| Driving | ParamSpeedThresholdForDrivingInKmh (20) |
| Cycling | ParamSpeedThresholdForCyclingInKmh (10) |
| Walking | ParamSpeedThresholdForWalkingInKmh (2) |
| Still | 0 |
| Unknown | −1 |

Using the measurement scores as outlined in Tables 2 and 3, for example, the location score 162, which may correspond to at least one of the 'ArrivalTestScore' and 'EnrouteTestScore', may be determined from the contents of the history database 140 including the location measurements 164 and/or activity statuses 166. In an example, a an activity status 166 corresponding to a driving event may have been detected by the application module 108 and added to the history database 140. Prior to the addition of the driving event, the most recent event in the history database 140 may have been a single still event (e.g., which may be an activity status 166 or a location measurement 164 with the speed/velocity mapped to the activity status 166).

Each event in the history database 140 may contribute to the location score 162 (e.g., 'ArrivalTestScore' and/or 'EnrouteTestScore') depending on whether the measurement score associated with the event is a positive or negative value. The measurement scores may also be weighted when applied to the location score 162. Initially, the measurement score may be weighted according to what fraction of a total time between an oldest and latest events the event (e.g., location measurement 164 and/or activity status 166) associated with the measurement score occupies in the history database 140. In the above example having two events, each is allocated half the time between the first and second event, and as such, each may have an equal weight of '0.5'. In instances where there are three events having measurement scores s0, s1, and s2 at times t0, t1, and t2, respectively, then the weighted location score 162 may be determined according to:

$$s0\frac{t1-t0}{t2-t0}\frac{1}{2}, s1\frac{t1-t0}{t2-t0}\frac{1}{2}, s1\frac{t2-t1}{t2-t0}\frac{1}{2}, s2\frac{t2-t1}{t2-t0}\frac{1}{2},$$

such that each event contributes to half the time between the event and preceding and following event. When the weights are summed, the following is obtained:

$$\frac{t1-t0+t1-t0+t2-t1+t2-t1}{t2-t0}\frac{1}{2} =$$
$$\frac{-t0-t0+t2+t2}{t2-t0}\frac{1}{2} = \frac{2(t2-t0)}{t2-t0}\frac{1}{2} = 1,$$

The second weight may be based on an absolute age of the event, where a most recent event has a weight of 1.0, and the weight decreases linearly such that an event whose age corresponds to a maximum history time value (e.g., 180 sec by default) would have a weight of 0.0. This may provide more recent events great importance than older ones. Once the weights have been applied and the scores summed, two scores may be obtained (>=0), 'ArrivalTestScore' and 'EnrouteTestScore' for use in the location state triggering decision. In the above example, the 'ArrivalTestScore' may be 1 (e.g., the Still score of 2 times its 0.5 weight) multiplied by the associated age weight, and the 'EnrouteTestScore' may be 7.5 (e.g., 15 times the associated 0.5 weight). The scores, each of which may correspond to the location state transition condition 158, may then be compared to a corresponding location station transition threshold 160 to determine whether to transition to the second location state 154.

In the unknown, arrived transition, and departure transition states, the location scores 162 may be determined differently from the arrived and enroute states. For instance, for events corresponding to activity statuses 166, an associated 'TestScore' may be incremented by the measurement score for the activity status 166 (e.g. ArrivalTestScore+=2 for a still event, EnrouteTestScore+=15 for a driving Activity).

For events corresponding to location measurements 164, the measurement scores may be updated according to at least a number of factors such as, but not limited to, an instantaneous speed reported in the event, a derived speed calculated from a current location and/or an anchor location(s), and/or a distance from the anchor location. For the arrival transition state, the 'ArrivalTestScore' may be determined based on a proximity to a well-known location (e.g., from a table including well-known places).

As noted above, the location state 150 may provide a deeper layer or understanding of a user's movements and movement patterns. For instance, the location state 150 may be used by one or more applications to provide a more in depth targeting of user preferences or services based on user activity and movement. Further, the electronic device 100 may configure one or more components according to the location state 150 transitions. For example, upon transitioning to a walking or still state, a sampling of location data from the location sensors 132 may be adjusted to account for the rate of expected change of user distance. In other words, when the user is walking or still, the electronic device 100 may conserve limited power supply by reducing the sampling rate of the location sensors 132 (e.g., adjusting a GPS sensor).

Figure 2:
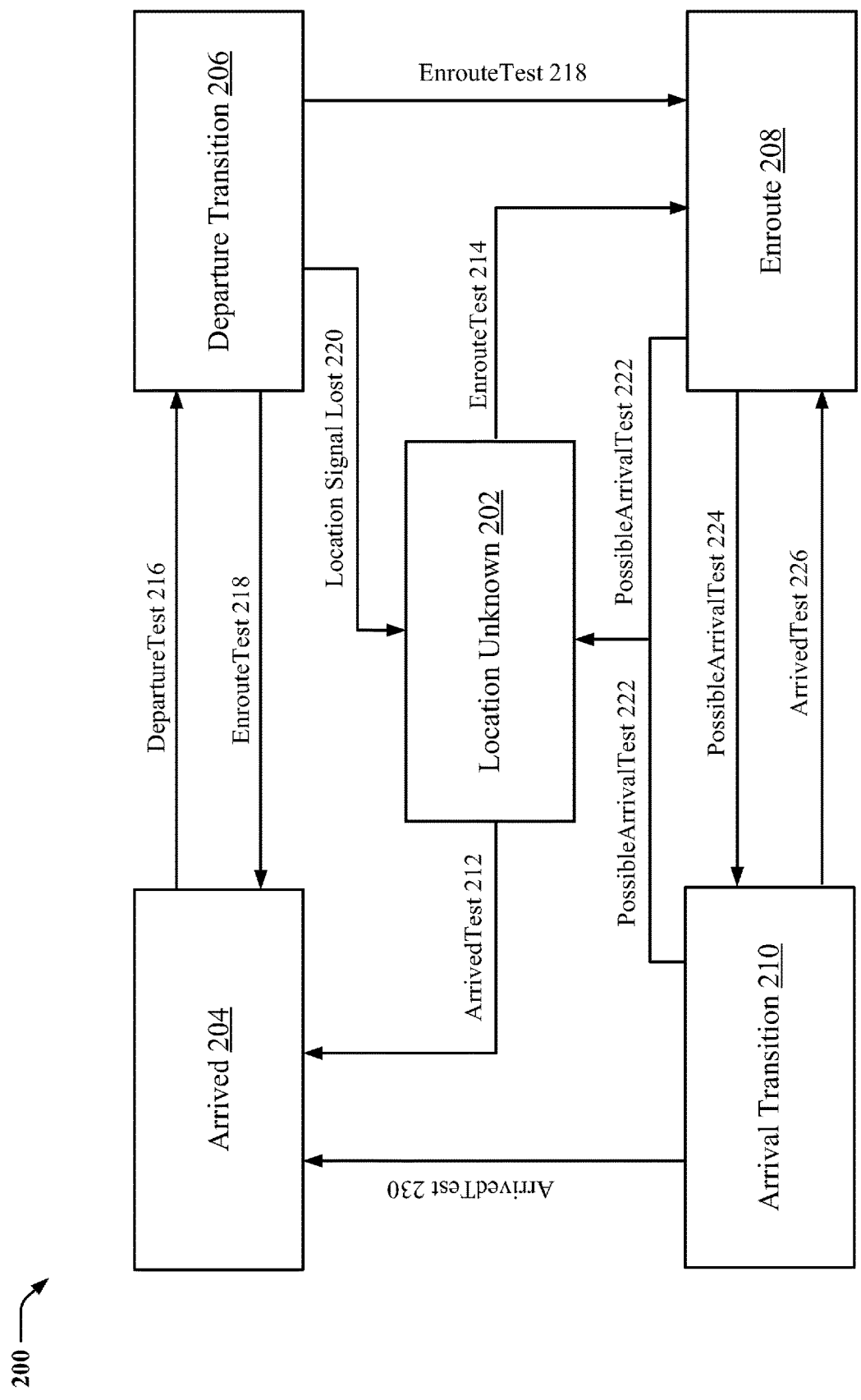
FIG. 2 is a conceptual diagram of example location states and location state transitions in accordance with some implementations.

FIG. 2 illustrates a conceptual location state diagram 200 of a plurality of location states 150 for location detection. For example, the conceptual location state diagram 200 illustrates the plurality of location states 150 and the transitions between each of the plurality of location states 150. Further, the conceptual location state diagram 200 illustrates the tests and/or conditions associated with triggering an entry or exit to or from each of the plurality of location states 150.

In an aspect, an electronic device, such as the electronic device 100, may configure a location state determination component, such as location state determination component 110, to determine whether to transition between location states 150, such as, transition from a first location state 152 to a second location state 154. In another aspect, electronic device 100 and/or location state determination component 110 may determine whether to maintain a current location, for example, the first location state 152. For example, the electronic device 100 and/or location state determination component 110 may execute the determination component 156 to determine whether the location state transition condition 158 satisfies a location state transition threshold 160 triggering an entry or exit to or from the first location state 152.

In an aspect, for example, the first location state 152 and/or the second location state 154 may correspond to at least one of a location unknown state 202 which may indicate that a location of the electronic device 100 is unknown or undetermined; an arrived state 204 which may indicate that a movement or travel of the electronic device 100 is representative of an arrival at a particular location; a departure transition state 206 which may indicate that a movement or travel of the electronic device 100 is representative of a departure from the departed location; an enroute state 208 which may indicate that the electronic device 100 is moving or traveling from the departed location; and/or an arrival transition state 210 which may indicate a change in a movement or travel of the electronic device 100 representative of an approaching arrival to an arrival location. As described further herein, each of the location states 150 (e.g., location unknown state 202, arrived state 204, departure transition state 206, enroute state 208, and arrival transition state 210) may be associated with a corresponding location state transition condition 158 and a corresponding location state transition threshold 160, that when satisfied may cause the electronic device 100 to trigger an entry or exit to or from the respective location state.

In an aspect, the location unknown state 202 may include and/or be associated with at least one location state transition condition 158. For example, the at least one location state transition condition 158 may include one or more entry conditions which may include a location signal of the electronic device 100 being lost and/or the initialization of the electronic device 100 and/or an application configured to operate the location state determination component 110. In an example, the electronic device 100 may be operating in a current location state different from the location unknown state 202, such as the departure transition state 206, the enroute state 208, or the arrival transition state 210, and fail to receive a wireless signal (e.g., GPS signal) for determining the current position of the electronic device 100. In some instances, the location sensor(s) 132 may not be currently receiving GPS signals due to a number reasons, such as, but not limited to, hardware malfunction, inability to access the satellite network, etc. As such, the electronic device 100 may exit the current location state (e.g., the departure transition state 206, the enroute state 208, the arrival transition state 210) and transition to the location unknown state 202. In another example, if the electronic device 100 is powered on and/or the location state determination component 110 is initialized, then the entry condition for the location unknown state 202 may be satisfied and the electronic device 100 may transition to the location unknown state 202.

Once the electronic device 100 is operating in the location unknown state 202, the sampling rate 170 for each of the one or more sensors (e.g., location sensor(s) 132) of the electronic device 100 may be adjusted. The sample rate 170 for each of the one or more location sensors 132 correspond to a frequency of communication of signals for sampling a plurality of location measurements 164. For example, the one or more location sensors 132 may correspond to GPS sensors, and the electronic device 100 and/or the location state determination component 110 may execute adjustment component 168 to adjust the sampling rate 170 to increase the frequency of sampling the plurality of location measurements 164. Additionally, in an example, the electronic device 100 and/or location state determination component 110 may also adjust the sampling rate corresponding to the activity sensors 134 (e.g., MEMs, gyrator, accelerometer, compass, etc.) to increase the frequency of sampling the activity status 166.

Further, the electronic device 100 may determine whether to transition to a new location state (e.g., the arrived state 204 and/or the enroute state 208) from the location unknown state 202 based on determining whether the location state transition condition 158 satisfies a location state transition threshold 160. For example, the electronic device 100 may transition from the location unknown state 202 to a new location state based on a determination that the location state transition condition 158 satisfies a location state transition threshold 160. In an example, the at least one location state transition condition 158 may include one or more exit conditions. The electronic device 100 and/or location state determination component 110 may execute the determination component 156 to determine whether to transition to a new location state by calculating one or more of an instantaneous velocity, displacement distance, or departure velocity using the location measurements 164, determine whether at least one of the instantaneous velocity, displacement distance, or departure velocity of the electronic device 100 satisfies at least one of a plurality of condition thresholds, and adjust the location score 162 accordingly.

Specifically, the electronic device 100 and/or location state determination component 110 may adjust the location score 162 based on the activity status 166 of the electronic device 100 and a determination that at least one of the instantaneous velocity, displacement distance, or departure velocity of the electronic device 100 satisfies the plurality of condition thresholds. In an example, the location score 162 associated with the location unknown state 202 may correspond to one or both of an ArrivalTestScore (corresponding to the arrived state 204) set to zero (0) or an EnrouteTestScore (corresponding to the enroute state 208) set to zero (0). The electronic device 100 and/or location state determination component 110 may then adjust the ArrivalTestScore and EnrouteTestScore based on the activity status 166 of the electronic device 100 and a determination that at least one of the instantaneous velocity, displacement distance, or departure velocity of the electronic device 100 satisfies the plurality of condition thresholds. For example, if the departure velocity is less than a maximum departure velocity, then the electronic device 100 and/or location state determination component 110 may increment the ArrivalTestScore by a predetermined delta amount. In another example, if the departure velocity is greater than a minimum departure velocity, then the electronic device 100 and/or location state determination component 110 may increment the EnrouteTestScore by a predetermined delta amount. In another example, if the instantaneous velocity is less than a maximum instantaneous velocity, then the electronic device 100 and/or location state determination component 110 may increment the ArrivalTestScore by a predetermined delta amount. In another example, if the instantaneous velocity is greater than a minimum instantaneous velocity, then the electronic device 100 and/or location state determination component 110 may increment the EnrouteTestScore by a predetermined delta amount. In another example, if the activity status 166 of the electronic device 100 corresponds to either still or tilting, then the electronic device 100 and/or location state determination component 110 may increment the ArrivalTestScore by a predetermined delta amount. In another example, if the activity status 170 of the electronic device 100 corresponds to either walking, riding, or driving, then the electronic device 100 and/or location state determination component 110 may increment the EnrouteTestScore by a predetermined delta amount.

Subsequently, the electronic device 100 and/or location state determination component 110 may determine whether the one or more exit conditions corresponding to the location state transition condition 158 have been satisfied based on the location score 162 using at least one of the activity status 166, the instantaneous velocity, displacement distance, or departure velocity of the electronic device 100. For example, for the location unknown state 202, the one or more exit conditions may include an ArrivedTest 212 and an EnrouteTest 214. If the ArrivedTest 212 is TRUE, then an exit condition is satisfied, and the electronic device 100 and/or location state determination component 110 may transition from the location unknown state 202 to the arrived state 204. If the EnrouteTest 214 is TRUE, then an exit condition 160 is satisfied, and the electronic device 100 and/or location state determination component 110 may transition from the location unknown state 202 to the enroute state 208. If none of the exit conditions 160 are satisfied then the electronic device 100 and/or location state determination component 110 will remain in the location unknown state 202.

In order to determine whether the ArrivedTest 212 is TRUE, the electronic device 100 and/or location state determination component 110 may determine whether the departure velocity is less than a departure velocity threshold for a minimum number of consecutive samples and/or for a period of time. The electronic device 100 and/or location state determination component 110 may also adjust confidence levels associated with the minimum number of consecutive samples and the period of time. In an example, the electronic device 100 and/or location state determination component 110 may increase the confidence level based on determining that the instantaneous velocity is less than an instantaneous velocity threshold and that the activity status 166 of the electronic device 100 is either still or tilting. As such, if the electronic device 100 and/or location state determination component 110 determines that the departure velocity is less than a departure velocity threshold for a minimum number of consecutive samples and/or for a period of time then the ArrivedTest 212 is TRUE, and the electronic device 100 and/or location state determination component 110 transitions from the location unknown state 202 to the arrived state 204.

In order to determine whether the EnrouteTest 214 is TRUE, the electronic device 100 and/or location state determination component 110 may determine whether departure velocity is greater than a departure velocity threshold for a minimum number of consecutive samples and/or for a period of time. The electronic device 100 and/or location state determination component 110 may also adjust confidence levels associated with the minimum number of consecutive samples and the period of time. In an example, the electronic device 100 and/or location state determination component 110 may increase the confidence level based on determining that the instantaneous velocity exceeds an instantaneous velocity threshold and that the activity status 166 of the electronic device 100 is either walking, riding, or driver. As such, if the electronic device 100 and/or location state determination component 110 determines that the departure velocity is greater than a departure velocity threshold for a minimum number of consecutive samples and/or for a period of time then the EnrouteTest 214 is TRUE, and the electronic device 100 and/or location state determination component 110 transitions from the location unknown state 202 to the enroute state 208.

In an aspect, the arrived state 204 may include, and/or be associated with at least one location state transition condition 158. For example, the at least one location state transition condition 158 may include one or more entry conditions corresponding to at least one of an ArrivedTest 212, an ArrivedTest 230, and an EnrouteTest 218. In an example, the electronic device 100 and/or location state determination component 110 may be operating in a current location state, such as location unknown state 202 or arrival transition state 210. The electronic device 100 and/or location state determination component 110 may determine that the ArrivedTest 212 or the ArrivedTest 230 is TRUE. As such, the electronic device 100 and/or location state determination component 110 may exit the current location state (e.g., location unknown state 202 or arrival transition state 210) and transition to the arrived state 204. In another example, the electronic device 100 and/or location state determination component 110 may be operating in the current location state, such as the departure transition state 206, and the electronic device 100 and/or location state determination component 110 may determine that the EnrouteTest 218 is FALSE. As such, the electronic device 100 and/or location state determination component 110 may exit the current location state (e.g., departure transition state 206) and transition to the arrived state 204.

Once the electronic device 100 and/or location state determination component 110 is operating in the arrived state 204, the sampling rate for each of the one or more sensors (e.g., location sensor(s) 132) of the electronic device 100 may be adjusted. For example, the location sensor(s) 132 may correspond to GPS sensors, and the electronic device 100 and/or location state determination component 110 may suspend and/or halt the GPS sampling (e.g., by powering down the location sensor(s) 132). Additionally, the one or more sensors may also correspond to activity detection sensors (e.g., MEMs, gyrator, accelerometer, compass, etc.), and the electronic device 100 and/or location state determination component 110 may also adjust the sampling rate of the activity sensor(s) 134 (e.g., MEMs, gyrator, accelerometer, compass, etc.) to increase the frequency of sampling the location measurements 164. The electronic device 100 and/or location state determination component 110 may also set place data corresponding to the current geolocation for the arrived state 204.

Further, the electronic device 100 and/or location state determination component 110 may determine whether to transition to a new location state (e.g., departure transition state 206) from the arrived state 204 based on determining whether the one or more exit conditions corresponding to the location state transition condition 158 satisfies a location state transition threshold 160. For example, the electronic device 100 and/or location state determination component 110 may transition from the arrived state 204 to a new location state based on determining that the one or more entry conditions of a new location state 152 or the one or more exit conditions of the arrived state 204 have been satisfied. In an example, the electronic device 100 and/or location state determination component 110 may determine whether to transition to a new location state from the arrived state 204 by calculating one or more of an instantaneous velocity, displacement distance, or departure velocity using the measurements 164, determining whether at least one of the instantaneous velocity, displacement distance, or departure velocity of the electronic device 100 satisfies at least one of a plurality of condition thresholds, and adjusting the location score 162.

Specifically, the electronic device 100 and/or location state determination component 110 may adjust the location score 162 that triggers a transition to one or more new location states based on the activity status 166 of the electronic device 100 and a determination that at least one of the instantaneous velocity, displacement distance, or departure velocity of the electronic device 100 satisfies the plurality of condition thresholds. Subsequently, the electronic device 100 and/or location state determination component 110 may determine whether the one or more exit conditions have been satisfied based on the one or more transition score levels and at least one of the activity status 166, the instantaneous velocity, displacement distance, or departure velocity of the electronic device 100. For example, for the arrived state 204, the one or more exit conditions may include an DepartureTest 216. If the DepartureTest 216 is TRUE, then an exit condition is satisfied, and the electronic device 100 and/or location state determination component 110 may transition from the arrived state 204 to the departure transition state 206. If none of the exit conditions are satisfied then the electronic device 100 and/or location state determination component 110 will remain in the arrived state 204.

In order to determine whether the DepartureTest 216 is TRUE, the electronic device 100 and/or location state determination component 110 may determine whether the activity status 166 is at least one of walking, riding, or driving for a minimum number of consecutive samples and/or for a period of time. The electronic device 100 and/or location state determination component 110 may also adjust confidence levels associated with the minimum number of consecutive samples and the period of time. As such, if the electronic device 100 and/or location state determination component 110 determines that the activity status 166 is at least one of walking, riding, or driving for a minimum number of consecutive samples and/or for a period of time then DepartureTest 216 is TRUE, and the electronic device 100 and/or location state determination component 110 may transition from the arrived state 204 to the departure transition state 206.

In an aspect, the departure transition state 206 may include and/or be associated with at least one location state transition condition 158. For example, the at least one location state transition condition 158 may include one or more entry conditions which may include at least a DepartureTest 216. In an example, the electronic device 100 and/or location state determination component 110 may be operating in a current location state, such as the arrived state 204, and the electronic device 100 and/or location state determination component 110 may determine that the DepartureTest 216 is TRUE. As such, the electronic device 100 and/or location state determination component 110 may exit the current location state (e.g., the arrived state 204) and transition to the departure transition state 204.

Once the electronic device 100 and/or location state determination component 110 is operating in the departure transition state 206, the sampling rate for each of the one or more sensors (e.g., location sensor(s) 132) of the electronic device 100 may be adjusted. For example, the location sensors 132 may correspond to GPS sensors, and the electronic device 100 and/or location state determination component 110 may adjust the sampling rate to increase the frequency of sampling the measurements 164. Additionally, the one or more sensors may also correspond to activity detection sensors (e.g., MEMs, gyrator, accelerometer, compass, etc.), and the electronic device 100 and/or location state determination component 110 may also adjust the sampling rate of the activity sensors 134 (e.g., MEMs, gyrator, accelerometer, compass, etc.) to increase the frequency of sampling the measurements 164.

Further, the electronic device 100 and/or location state determination component 110 may determine whether to transition to a new location state (e.g., the arrived state 204 and/or the enroute state 208) from the departure transition state 206 based on one or more exit conditions corresponding to the at least one location state transition condition 158. For example, the electronic device 100 and/or location state determination component 110 may transition from the departure transition state 206 to a new location state based on determining that the one or more entry conditions of a new location state or the one or more exit conditions of the departure transition state 206 have been satisfied. In an example, the electronic device 100 and/or location state determination component 110 may determine whether to transition to a new location state by calculating one or more of an instantaneous velocity, displacement distance, or departure velocity using the measurements 164, determining whether at least one of the instantaneous velocity, displacement distance, or departure velocity of the electronic device 100 satisfies at least one of a plurality of condition thresholds, and adjusting the location score 162.

Specifically, the electronic device 100 and/or location state determination component 110 may adjust one or more transition score levels that trigger a transition to one or more new location states based on the activity status 166 of the electronic device 100 and a determination that at least one of the instantaneous velocity, displacement distance, or departure velocity of the electronic device 100 satisfies the plurality of condition thresholds. Subsequently, the electronic device 100 and/or location state determination component 110 may determine whether the one or more exit conditions have been satisfied based on at least one of the activity status 166, the instantaneous velocity, displacement distance, or departure velocity of the electronic device 100. For example, for the departure transition state 206, the one or more exit conditions may include an EnrouteTest 218. If the EnrouteTest 218 is TRUE, then an exit condition is satisfied, and the electronic device 100 and/or location state determination component 110 may transition from the departure transition state 206 to the enroute state 208. If the EnrouteTest 218 is FALSE, then an exit condition is not satisfied, and the electronic device 100 and/or location state determination component 110 may transition from the departure transition state 206 to the arrived state 204. If the electronic device 100 and/or location state determination component 110 determines the location signal lost 220 (e.g., the location sensor(s) 132 fails to sense a GPS signal) then the electronic device 100 and/or location state determination component 110 may transition to the location unknown state 202.

In order to determine whether the EnrouteTest 218 is TRUE or FALSE, the electronic device 100 and/or location state determination component 110 may determine whether the departure velocity is greater than a departure velocity threshold for a minimum number of consecutive samples and/or for a period of time. The electronic device 100 and/or location state determination component 110 may also adjust confidence levels associated with the minimum number of consecutive samples and the period of time. In an example, the electronic device 100 and/or location state determination component 110 may increase the confidence level based on determining that the instantaneous velocity is greater than an instantaneous velocity threshold and that the activity status 166 of the electronic device 100 is either walking, riding, or driving. As such, if the electronic device 100 and/or location state determination component 110 determines that the departure velocity is greater than a departure velocity threshold for a minimum number of consecutive samples and/or for a period of time then the EnrouteTest 218 is TRUE, and the electronic device 100 and/or location state determination component 110 transitions from the departure transition state 206 to the enroute state 208. If these conditions are not met (e.g., the electronic device 100 and/or location state determination component 110 determines that the departure velocity is not greater than a departure velocity threshold for a minimum number of consecutive samples and/or for a period of time), then the electronic device 100 and/or location state determination component 110 may transition from the departure transition state 206 to the arrived state 204.

In an aspect, the enroute state 208 may include, and/or be associated with at least one location state transition condition 158. For example, the at least one location state transition condition 158 may include one or more entry conditions which may include at least one of the EnrouteTest 214, the EnrouteTest 218, and/or the ArrivedTest 226. In an example, the electronic device 100 and/or location state determination component 110 may be operating in a current location state, such as the location unknown state 202, and the electronic device 100 and/or location state determination component 110 may determine that the EnrouteTest 214 is TRUE. As such, the electronic device 100 and/or location state determination component 110 may exit the current location state (e.g., the location unknown state 202) and transition to the enroute state 208. In another example, the electronic device 100 and/or location state determination component 110 may be operating in a current location state, such as the arrival transition state 210, and the electronic device 100 and/or location state determination component 110 may determine that the ArrivedTest 226 is FALSE. As such, the electronic device 100 and/or location state determination component 110 may exit the current location state (e.g., the arrival transition state 210) and transition to the enroute state 208.

Once the electronic device 100 and/or location state determination component 110 is operating in the enroute state 208, the sampling rate for each of the one or more sensors (e.g., location sensor(s) 132) of the electronic device 100 may be adjusted. For example, the location sensor(s) 132 may correspond to GPS sensors, and the electronic device 100 and/or location state determination component 110 may adjust the sampling rate to a high rate in order to increase the frequency of sampling the plurality of measurements. Additionally, the electronic device 100 may also adjust the sampling rate of activity sensors 134 (e.g., MEMs, gyrator, accelerometer, compass, etc.) to a high rate in order to increase the frequency of sampling the location measurements 164.

Further, the electronic device 100 and/or location state determination component 110 may determine whether to transition to a new location state (e.g., the location unknown state 202 and/or the arrival transition state 210) from the enroute state 208 based on one or more exit conditions corresponding to the at least one location state transition condition 158. For example, the electronic device 100 and/or location state determination component 110 may transition from the enroute state 208 to a new location state based on determining that the one or more entry conditions of a new location state or the one or more exit conditions of the enroute state 208 have been satisfied. In an example, the electronic device 100 may determine whether to transition to a new location state by calculating one or more of an instantaneous velocity, displacement distance, or departure velocity using the plurality of measurements, determining whether at least one of the instantaneous velocity, displacement distance, or departure velocity of the UE satisfies at least one of a plurality of condition thresholds, and adjusting the location score 162.

Specifically, the electronic device 100 and/or location state determination component 110 may adjust the location score 162 based on the activity status 166 of the electronic device 100 and a determination that at least one of the instantaneous velocity, displacement distance, or departure velocity of the electronic device 100 and/or location state determination component 110 satisfies the plurality of condition thresholds. Subsequently, the electronic device 100 and/or location state determination component 110 may determine whether the one or more exit conditions have been satisfied based on the one or more transition score levels and at least one of the activity status, the instantaneous velocity, displacement distance, or departure velocity of the electronic device 100. For example, for the enroute state 208, the one or more exit conditions may include an PossibleArrivalTest 222. If the PossibleArrivalTest 222 is TRUE, then the exit condition is satisfied, and the electronic device 100 and/or location state determination component 110 may transition from the enroute state 208 to the arrival transition state 210. If the PossibleArrivalTest 222 is FALSE, then the exit condition is not satisfied, and the electronic device 100 and/or location state determination component 110 may remain at the enroute state 208. If the electronic device 100 and/or location state determination component 110 determines the location signal lost 220 (e.g., the location sensor(s) 132 fail to sense a GPS signal) then the electronic device 100 and/or location state determination component 110 may transition to the location unknown state 202.

In order to determine whether the PossibleArrivalTest 222 is TRUE or FALSE, the electronic device 100 and/or location state determination component 110 may determine whether the instantaneous velocity is less than an instantaneous velocity threshold for a minimum number of consecutive samples and/or for a period of time. The electronic device 100 and/or location state determination component 110 may also adjust confidence levels associated with the minimum number of consecutive samples and the period of time. As such, if the electronic device 100 and/or location state determination component 110 determines that the instantaneous velocity is less than an instantaneous velocity threshold for a minimum number of consecutive samples and/or for a period of time then PossibleArrivalTest 222 is TRUE, and the electronic device 100 and/or location state determination component 110 transitions from the enroute state 208 to the arrival transition state 210. If these conditions are not met (e.g., the electronic device 100 and/or location state determination component 110 determines that the instantaneous velocity is not less than an instantaneous velocity threshold for a minimum number of consecutive samples and/or for a period of time), then the electronic device 100 and/or location state determination component 110 may remain at the enroute state 208.

In an aspect, arrival transition state 210 may include and/or be associated with at least one location state transition condition 158. For example, the at least one location state transition condition 158 may include one or more entry conditions which may include PossibleArrivalTest 222. In an example, the electronic device 100 and/or location state determination component 110 may be operating in another state, such as the enroute state 208, and the electronic device 100 and/or location state determination component 110 may determine that PossibleArrivalTest 222 is TRUE. As such, the electronic device 100 and/or location state determination component 110 may exit the state (e.g., the enroute state 208) and transition to the arrival transition state 210.

Once the electronic device 100 and/or location state determination component 110 is operating in the arrival transition state 210, the sampling rate 170 for each of the location sensor(s) 132 of the electronic device 100 and/or location state determination component 110 may be adjusted. For example, the location sensor(s) 132 may correspond to GPS sensors, and the electronic device 100 and/or location state determination component 110 may adjust the sampling rate to a high rate in order to increase the frequency of sampling the plurality of measurements. Additionally, the electronic device 100 and/or location state determination component 110 may also adjust the sampling rate of the activity sensor(s) 134 (e.g., MEMs, gyrator, accelerometer, compass, etc.) to a high rate in order to increase the frequency of sampling the plurality of measurements.

Further, the electronic device 100 and/or location state determination component 110 may determine whether to transition to a new location state (e.g., the location unknown state 202 and/or the arrived state 204) from the arrival transition state 210 based on one or more exit conditions corresponding to the at least one location state transition condition 158. For example, the electronic device 100 and/or location state determination component 110 may transition from the arrival transition state 210 to a new location state based on determining that the one or more entry conditions of a new location state or the one or more exit conditions of the arrival transition state 210 have been satisfied. In an example, the electronic device 100 and/or location state determination component 110 may determine whether to transition to a new state by calculating one or more of an instantaneous velocity, displacement distance, or departure velocity using the plurality of measurements, determining whether at least one of the instantaneous velocity, displacement distance, or departure velocity of the electronic device 100 satisfies at least one of a plurality of condition thresholds, and adjusting the location score 162.

Specifically, the electronic device 100 and/or location state determination component 110 may adjust one or more transition score levels that trigger a transition to one or more new location states based on the activity status 166 of the electronic device 100 and a determination that at least one of the instantaneous velocity, displacement distance, or departure velocity of the electronic device 100 satisfies the plurality of condition thresholds. Subsequently, the electronic device 100 and/or location state determination component 110 may determine whether the one or more exit conditions have been satisfied based on the one or more transition score levels and at least one of the activity status, the instantaneous velocity, displacement distance, or departure velocity of the electronic device 100. For example, for the arrival transition state 210, the one or more exit conditions may include an PossibleArrivalTest 224. If the PossibleArrivalTest 224 is TRUE, then an exit condition is satisfied, and the electronic device 100 and/or location state determination component 110 may transition from the arrival transition state 210 to the arrived state 204. If the PossibleArrivalTest 224 is FALSE, then an exit condition is not satisfied, and the electronic device 100 and/or location state determination component 110 may transition from the arrival transition state 210 to the enroute state 208. If the electronic device 100 determines the location signal lost 220 (e.g., the location sensor(s) 132 fail to sense a GPS signal) then the electronic device 100 and/or location state determination component 110 may transition to the location unknown state 202.

In order to determine whether the PossibleArrivalTest 224 is TRUE or FALSE, the electronic device 100 and/or location state determination component 110 may determine whether the departure velocity is less than a departure velocity threshold for a minimum number of consecutive samples and/or for a period of time. The electronic device 100 and/or location state determination component 110 may also adjust confidence levels associated with the minimum number of consecutive samples and the period of time. In an example, the electronic device 100 and/or location state determination component 110 may increase the confidence level based on determining that the instantaneous velocity is less than an instantaneous velocity threshold and that the activity status 166 of the electronic device 100 is either still or tilting. As such, if the electronic device 100 and/or location state determination component 110 determines that the departure velocity is less than a departure velocity threshold for a minimum number of consecutive samples and/or for a period of time then PossibleArrivalTest 224 is TRUE, and the electronic device 100 and/or location state determination component 110 transitions from the arrival transition state 210 to the arrived state 204. If these conditions are not met (e.g., the electronic device 100 and/or location state determination component 110 determines that the departure velocity is not less than a departure velocity threshold for a minimum number of consecutive samples and/or for a period of time), then the electronic device 100 and/or location state determination component 110 may transition from the arrival transition state 210 to the enroute state 208.

Figure 3:
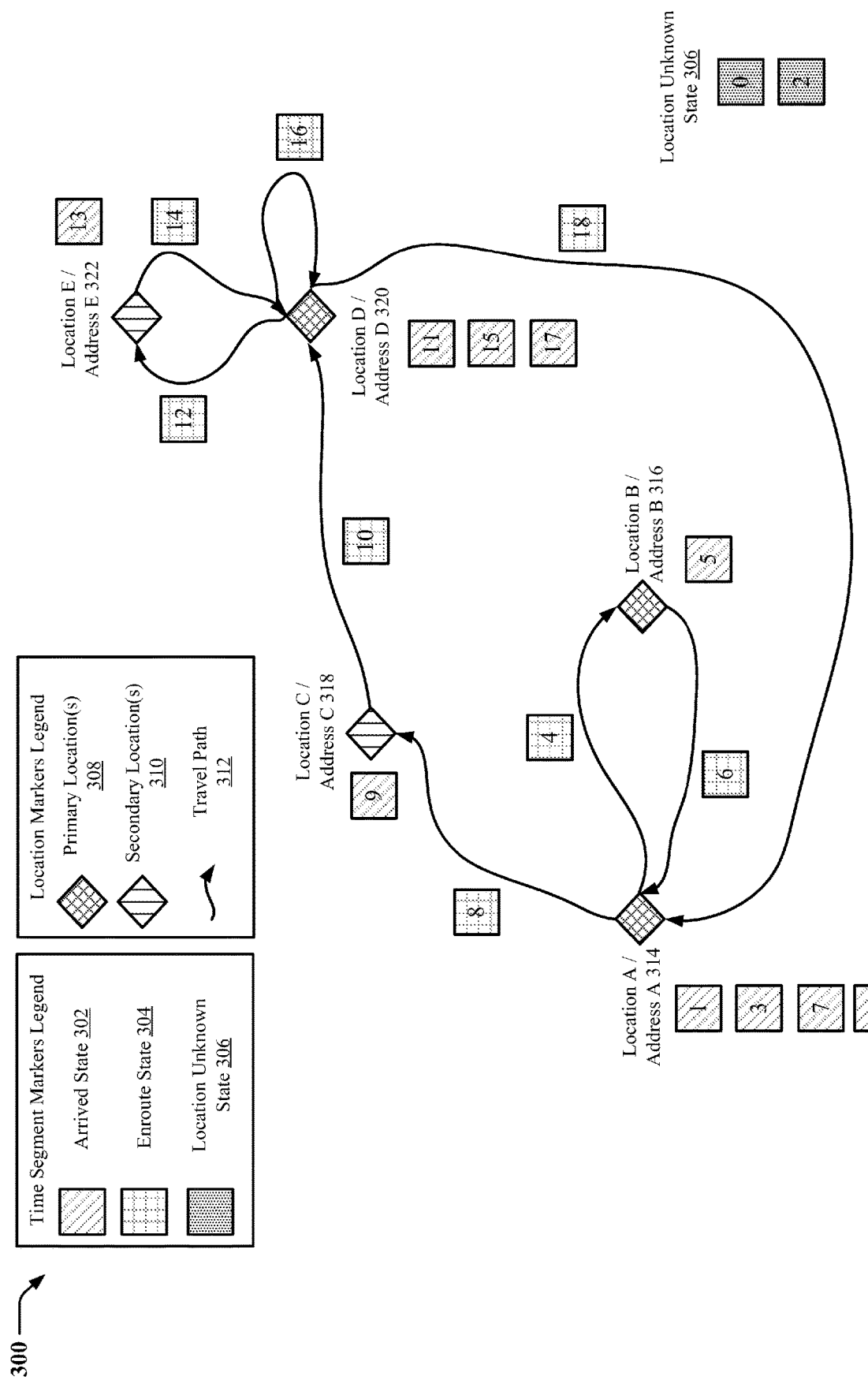
FIG. 3 is a conceptual diagram of an example electronic device movement scenario in accordance with some implementations.

FIG. 3 illustrates a conceptual diagram 300 of an example electronic device movement scenario. For example, the conceptual diagram 300 illustrates a location graph of the movement of a user of an electronic device, such as the electronic device 100, and the corresponding location states 150 along a travel path 312 between primary location(s) 308 and secondary location(s) 310. Further the conceptual diagram 300 illustrates a plurality of time segments (e.g., time segments 0-18) each of which may correspond to a location state 150, and may include additional information as described herein.

In an aspect, as described herein, the electronic device 100 may configure a location state determination component, such as location state determination component 110, to determine whether to transition between location states 150, such as, transition from a first location state 152 to a second location state 154. For example, time segment 0 may correspond to the electronic device 100 and/or the location state determination component 110 operating in a location unknown state 306. In some instances, the electronic device 100 and/or the location state determination component 110 may operate in a location unknown state 306 due to a location signal of the electronic device 100 being lost and/or the initialization of the electronic device 100 and/or an application configured to operate the location state determination component 110.

In an aspect, the electronic device 100 and/or the location state determination component 110 may transition to the arrived state 302 at Location A/Address A 314 at time segment 1 based on a determination that the location state transition condition 158 satisfies a location state transition threshold 160. For example, Location A/Address A 314 may correspond to a primary location 308 and be associated as "Home" and be located at 1032 Ramona St in Palo Alto, Calif. Further, at time segment 2, the electronic device 100 and/or the location state determination component 110 may transition back to the location unknown state 306. Subsequently, at time segment 3, the electronic device 100 and/or the location state determination component 110 may transition back to the arrived state 302 at Location A/Address A 314.

In an aspect, at time segment 4, the user of the electronic device 100 may begin driving along the travel path 312, and the electronic device 100 and/or the location state determination component 110 may transition to the enroute state 304. At time segment 5, the electronic device 100 and/or the location state determination component 110 may transition to the arrived state 306 at Location B/Address B 316. For example, Location B/Address B 316 may correspond to a primary location 308 and be associated as "School" and be located at 750 N California Ave in Palo Alto, Calif. Further, at time segment 6, the user of the electronic device 100 may begin driving along the travel path 312, and the electronic device 100 and/or the location state determination component 110 may transition to the enroute state 304. At time segment 7, the electronic device 100 and/or the location state determination component 110 may transition to the arrived state 306 at Location A/Address A 314.

In an aspect, at time segment 8, the user of the electronic device 100 may begin driving along the travel path 312, and the electronic device 100 and/or the location state determination component 110 may transition to the enroute state 304. At time segment 9, the electronic device 100 and/or the location state determination component 110 may transition to the arrived state 306 at Location C/Address C 318. For example, Location C/Address C 318 may correspond to a secondary location 310 and be associated as "Gas Station" and be located at 1161 Embarcadero Rd in Palo Alto, Calif. Further, at time segment 10, the user of the electronic device 100 may begin driving along the travel path 312, and the electronic device 100 and/or the location state determination component 110 may transition back to the enroute state 304.

In an aspect, at time segment 11, the electronic device 100 and/or the location state determination component 110 may transition to the arrived state 306 at Location D/Address D 320. For example, Location D/Address D 320 may correspond to a primary location 308 and be associated as "Work" and be located at 500 Island Pkwy in Redwood Shores, Calif. Further, at time segment 12, the user of the electronic device 100 may begin driving along the travel path 312, and the electronic device 100 and/or the location state determination component 110 may transition to the enroute state 304. At time segment 13, the electronic device 100 and/or the location state determination component 110 may transition to the arrived state 306 at Location E/Address E 318. For example, Location E/Address E 322 may correspond to a secondary location 310 and be associated as "Restaurant" and be located at 2397 Broadway St in Redwood City, Calif.

In an aspect, at time segment 14, the user of the electronic device 100 may begin driving along the travel path 312, and the electronic device 100 and/or the location state determination component 110 may transition to the enroute state 304. At time segment 15, the electronic device 100 and/or the location state determination component 110 may transition to the arrived state 306 at Location D/Address D 320. Further, in an example, at time segment 16, the user of the electronic device 100 may begin walking along the travel path 312, and the electronic device 100 and/or the location state determination component 110 may transition to the enroute state 304. At time segment 17, the electronic device 100 and/or the location state determination component 110 may transition to the arrived state 306 at Location D/Address D 320 (i.e., once the user has completed their walk along the travel path 13 during time segment 16).

In an aspect, at time segment 18, the user of the electronic device 100 may begin driving along the travel path 312, and the electronic device 100 and/or the location state determination component 110 may transition to the enroute state 304. At time segment 19, the user of the electronic device 100 may return "Home," and accordingly, the electronic device 100 and/or the location state determination component 110 may transition to the arrived state 302 at Location A/Address A 314. For example, Table 4 below provides example information for each of the time segments (e.g., start times, end times, location, and notes).

100 according to the above-described aspects to perform dynamic location state determination of the electronic device 100 based on location and activity events includes one or more of the herein-defined actions. Although the operations described below are presented in a particular order and/or as being performed by an example component, it should be understood that the ordering of the actions and the components performing the actions may be varied, depending on the implementation.

At block 402, the method 400 may receive at least one of a location measurement from the one or more sensors or an activity status of the electronic device from the at least one application module. For example, the electronic device 100 and/or location state determination component 110 may execute a communication component(s) 114 to receive at least one of a location measurement 164 from the one or more sensors (e.g., location sensor(s) 132) or an activity status 166 of the electronic device 100 from the at least one application module 108.

At block 404, the method 400 may determine a location state transition condition using one or both of the location measurement or the activity status of the electronic device. For example, the electronic device 100 and/or location state determination component 110 may execute a determination component 156 to determine a location state transition condition 158 using one or both of the location measurement 164 or the activity status 166 of the electronic device 100.

At block 406, the method 400 may determine whether the location state transition condition satisfies a location state transition threshold triggering an entry or exit to or from a first location state. For example, the electronic device 100 and/or location state determination component 110 may execute a determination component 156 to determine whether the location state transition condition 158 satisfies a location state transition threshold 160 triggering an entry or exit to or from a first location state 152. If, for example, the determination component 156 determines that the location state transition condition 158 satisfies a location state transition threshold 160, then method 400 may proceed to

TABLE 4

Example information for each of the time segments

| Time Segment # | Start | End | Location | Notes |
| --- | --- | --- | --- | --- |
| 0 | 3/3/14 1800 | 3/3/14 2100 | Unknown | Phone battery dies at 1800 |
| 1 | 3/3/14 2100 | 3/4/14 0035 | Home: 1032 Ramona, Palo Alto | Phone plugged in, turned on, and tracking recommences |
| 2 | 3/4/14 0035 | 3/4/14 0705 | Unknown | Phone turned off for the night |
| 3 | 3/4/14 0705 | 3/4/14 0715 | Home: 1032 Ramona, Palo Alto | Phone turned on, getting kids ready for school |
| 4 | 3/4/14 0715 | 3/4/14 0723 | (travel path) | Driving to school |
| 5 | 3/4/14 0723 | 3/4/14 0728 | School: 750 N California, Palo Alto | Dropping kids off at school |
| 6 | 3/4/14 0728 | 3/4/14 0735 | (travel path) | Driving home |
| 7 | 3/4/14 0735 | 3/4/14 0915 | Home: 1032 Ramona, Palo Alto | Getting ready for work |
| 8 | 3/4/14 0915 | 3/4/14 0919 | (travel path) | Leave for work |
| 9 | 3/4/14 0919 | 3/4/14 0928 | Embarcadero Shell Station, Palo Alto | Stopping for gas |
| 10 | 3/4/14 0928 | 3/4/14 0945 | (travel path) | Driving to work |
| 11 | 3/4/14 0945 | 3/4/14 1218 | Work: 500 Island Pkwy | Working |
| 12 | 3/4/14 1218 | 3/4/14 1230 | (travel path) | Heading to lunch |
| 13 | 3/4/14 1230 | 3/4/14 1340 | Broadway Marsala, Redwood City | Lunch |
| 14 | 3/4/14 1340 | 3/4/14 1353 | (travel path) | Back to work |
| 15 | 3/4/14 1353 | 3/4/14 1705 | Work: 500 Island Pkwy | Working |
| 16 | 3/4/14 1705 | 3/4/14 1730 | (travel path) | Walking break w/colleague |
| 17 | 3/4/14 1730 | 3/4/14 1912 | Work: 500 Island Pkwy | Working |
| 18 | 3/4/14 1912 | 3/4/14 1933 | (travel path) | Driving home |
| 19 | 3/4/14 1933 | 3/4/14 0715 | Home: 1032 Ramona, Palo Alto | At home, phone stays on until working |

Figure 4:
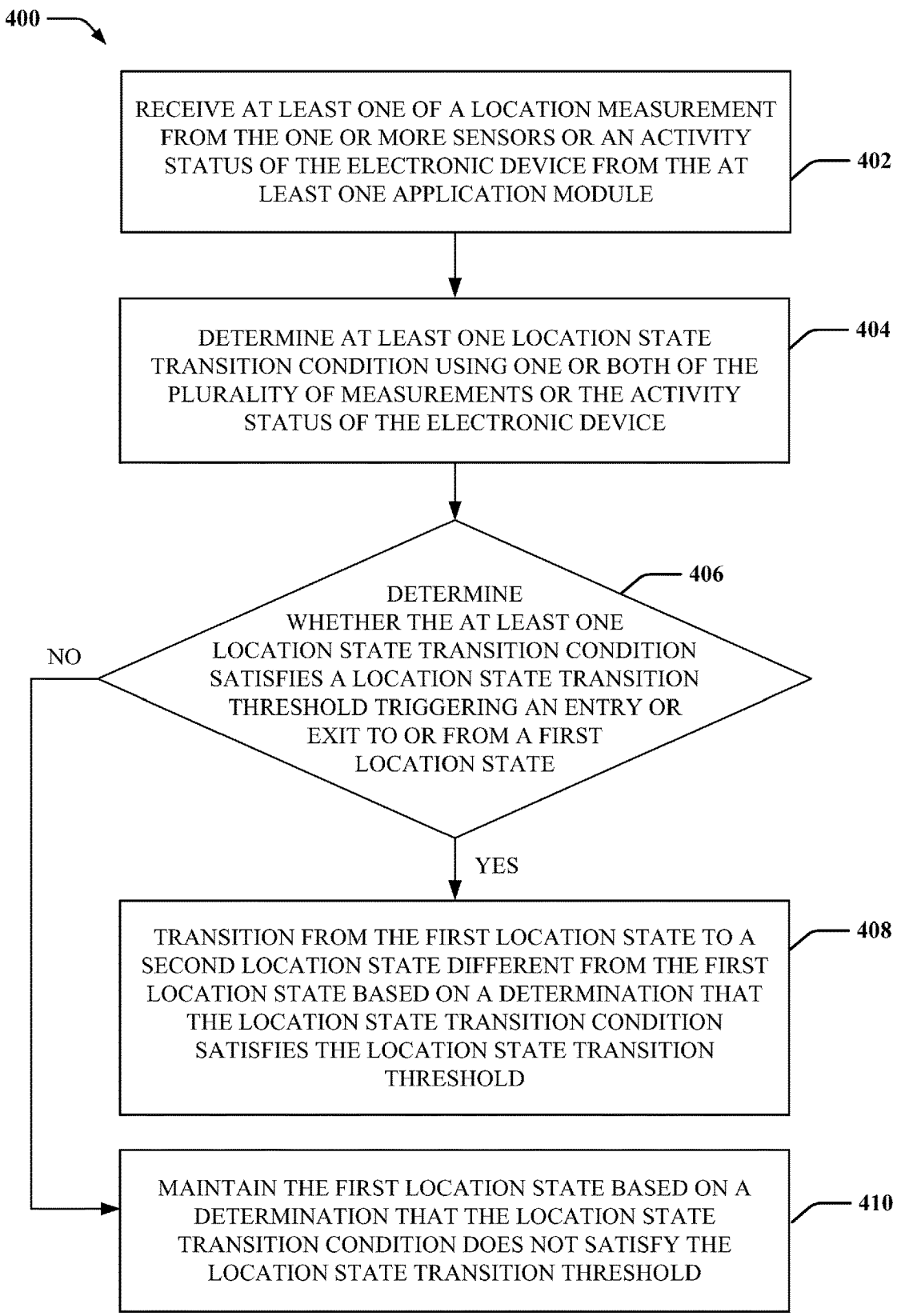
FIGS. 4 and 5 are flow charts of an example of a method location determination in accordance with some implementations.

Referring to FIG. 4, for example, a method 400 of wireless communication in operating the electronic device block 408. If, for example, the determination component 156 determines that the location state transition condition 158 does not satisfy a location state transition threshold 160, then method 400 may proceed to block 410.

At block 408, the method 400 may transition from the first location state to a second location state different from the first location state based on a determination that the location state transition condition satisfies the location state transition threshold. For example, the electronic device 100 and/or location state determination component 110 may execute a determination component 156 to transition from the first location state 152 to a second location state 154 different from the first location state 152 based on a determination that the location state transition condition 158 satisfies the location state transition threshold 160.

At block 410, the method 400 may maintain the first location state based on a determination that the location state transition condition does not satisfy the location state transition threshold. For example, the electronic device 100 and/or location state determination component 110 may execute a determination component 156 to maintain the first location state 152 based on a determination that the location state transition condition 158 does not satisfy the location state transition threshold 160.

Figure 5:
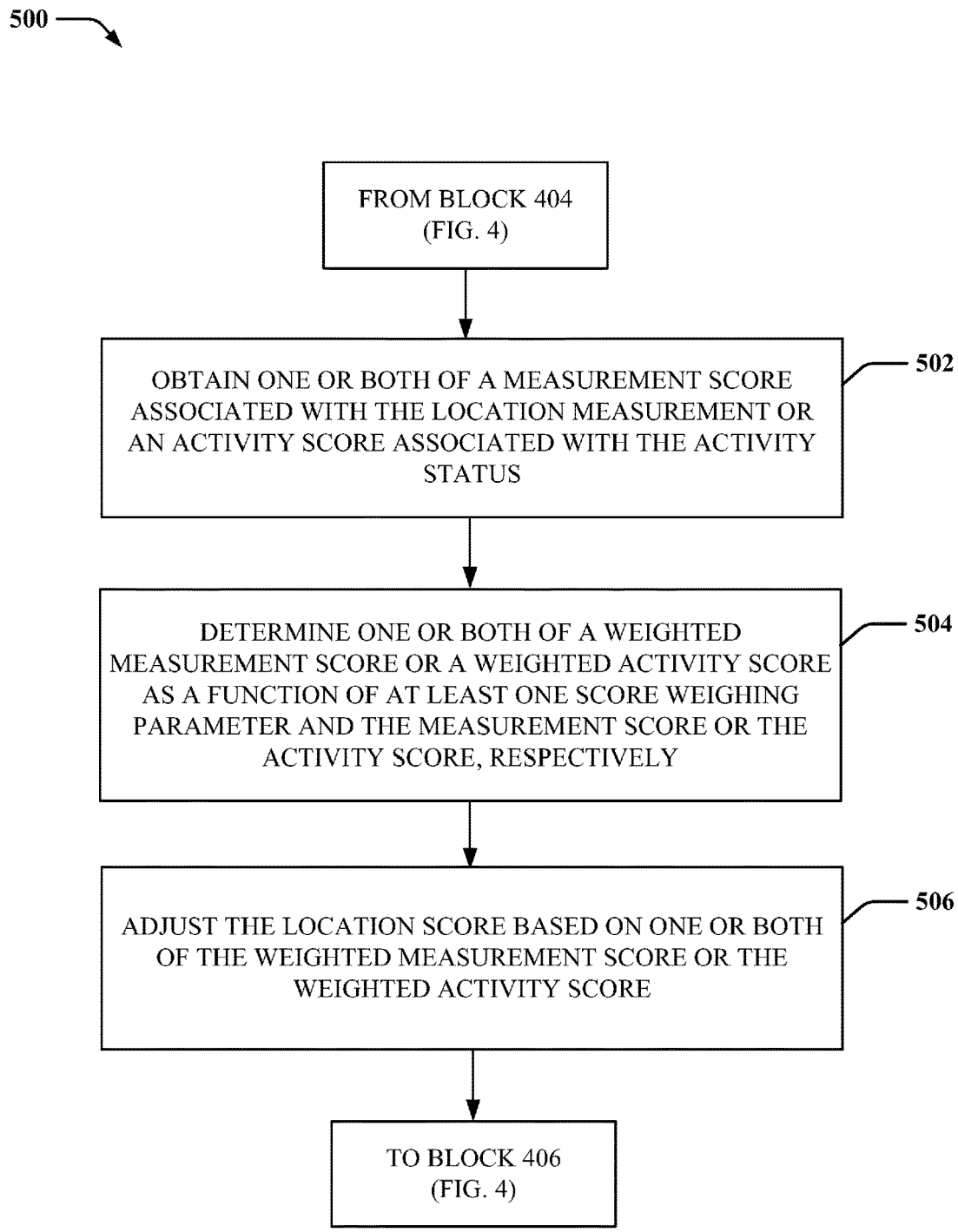

Referring to FIG. 5, for example, a method 500 of wireless communication in operating the electronic device 100 according to the above-described aspects to determine a location state transition condition using one or both of the location measurement or the activity status of the electronic device includes one or more of the herein-defined actions. Although the operations described below are presented in a particular order and/or as being performed by an example component, it should be understood that the ordering of the actions and the components performing the actions may be varied, depending on the implementation.

At block 502, the method 500 may obtain one or both of a measurement score associated with the location measurement or an activity score associated with the activity status. For example, the electronic device 100 and/or location state determination component 110 may execute a determination component 156 to obtain one or both of a measurement score associated with the location measurement 164 or an activity score associated with the activity status 166.

At block 504, the method 500 may determine one or both of a weighted measurement score or a weighted activity score as a function of at least one score weighing parameter and the measurement score or the activity score, respectively. For example, the electronic device 100 and/or location state determination component 110 may execute a determination component 156 to determine one or both of a weighted measurement score or a weighted activity score as a function of at least one score weighing parameter and the measurement score or the activity score, respectively.

At block 506, the method 500 may adjust the location score based on one or both of the weighted measurement score or the weighted activity score. For example, the electronic device 100 and/or location state determination component 110 may execute a determination component 156 to adjust the location score 162 based on one or both of the weighted measurement score or the weighted activity score.

Figure 6:
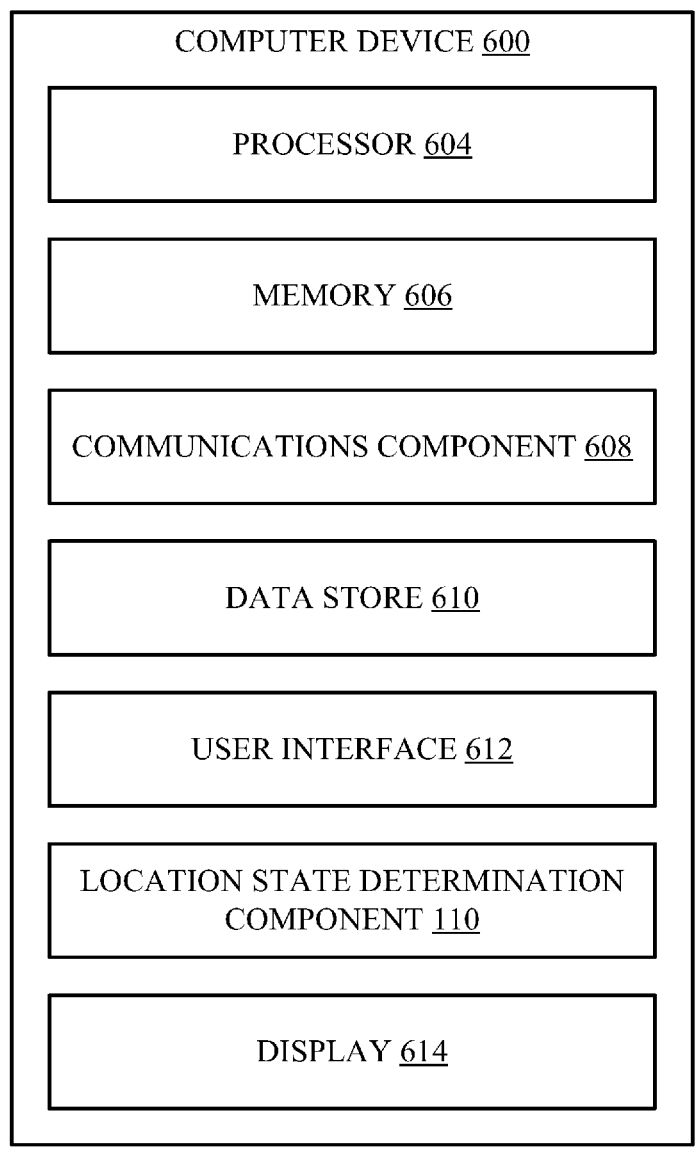
FIG. 6 is a schematic block diagram of an example computer device in accordance with some implementations.

Referring now to FIG. 6, an example computer device 600 includes additional component details as compared to FIGS. 1A and 1B. Computer device 600 may be the same as or similar to or another version of electronic device 100 (FIG. 1A). In one implementation, computer device 600 may include processor 604 for carrying out processing functions associated with one or more of components and functions described herein. Processor 604 can include a single or multiple set of processors or multi-core processors. Moreover, processor 604 can be implemented as an integrated processing system and/or a distributed processing system.

Computer device 600 may further include memory 606, such as for storing local versions of applications being executed by processor 604. Memory 606 can include a type of memory usable by a computer, such as random access memory (RAM), read only memory (ROM), tapes, magnetic discs, optical discs, volatile memory, non-volatile memory, and any combination thereof. Additionally, processor 604 and memory 606 may include and execute PPG indication correction component 110 (FIGS. 1A and 1B).

Further, computer device 602 may include a communications component 608 that provides for establishing and maintaining communications with one or more parties utilizing hardware, software, and services as described herein. Communications component 608 may carry communications between components on computer device 600, as well as between computer device 600 and external devices, such as devices located across a communications network and/or devices serially or locally connected to computer device 600. For example, communications component 608 may include one or more buses, and may further include transmit chain components and receive chain components associated with a transmitter and receiver, respectively, operable for interfacing with external devices.

Additionally, computer device 600 may include a data store 610, which can be any suitable combination of hardware and/or software, that provides for mass storage of information, databases, and programs employed in connection with implementations described herein. For example, data store 610 may be a data repository for adjustment triggering condition 158 (FIGS. 1A and 1B) and continuous adjustment time threshold (FIGS. 1A and 1B). In some implementations, computer device 600 may also include display 614 for displaying content.

Computer device 600 may also include a user interface component 612 operable to receive inputs from a user of computer device 600 and further operable to generate outputs for presentation to the user. User interface component 612 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 612 may include one or more output devices, including but not limited to a display, a speaker, a haptic feedback mechanism, a printer, any other mechanism capable of presenting an output to a user, or any combination thereof.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., electronic device 100 and/or computer device 500), which can be a wired device or a wireless device. A wireless device may be a wearable electronic device, a cellular telephone, a satellite phone, a cordless telephone, a Session Initiation Protocol (SIP) phone, a wireless local loop (WLL) station, a personal digital assistant (PDA), a handheld device having wireless connection capability, a computer device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features will be presented in terms of systems that may include a number of devices, components, modules, and the like. It is to be understood and appreciated that the various systems may include additional devices, components, modules, etc., and/or may not include all of the devices, components, modules, etc., discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with implementations disclosed herein.

What is claimed is:

1. A method of location determination, comprising:
   at an electronic device including one or more sensors and at least one application module:
   receiving at least one of a location measurement from the one or more sensors or an activity status of the electronic device from the at least one application module;
   determining a location state transition condition using one or both of the location measurement or the activity status of the electronic device, wherein the location state transition condition corresponds to a location score representing a confidence level of a location state of the electronic device and configured based on a history of location measurements or activity statuses, and wherein determining the location state transition condition using one or both of the location measurement or the activity status of the electronic device includes:
   obtaining one or both of a measurement score associated with the location measurement or an activity score associated with the activity status;
   determining one or both of a weighted measurement score or a weighted activity score as a function of at least one score weighing parameter and the measurement score or the activity score, respectively; and
   adjusting the location score based on one or both of the weighted measurement score or the weighted activity score;

determining whether the location state transition condition satisfies a location state transition threshold triggering an entry or exit to or from a first location state;

transitioning from the first location state to a second location state different from the first location state based on a determination that the location state transition condition satisfies the location state transition threshold; and maintaining the first location state based on a determination that the location state transition condition does not satisfy the location state transition threshold.

2. The method of claim 1, wherein the activity status corresponds to at least one of an unknown status, still status, tilting status, walking status, cycling status, or driving status, and wherein each of the unknown status, still status, tilting status, walking status, cycling status, and driving status is associated with at least one activity score.

3. The method of claim 1, wherein the location measurement from the one or more sensors corresponds to at least one of an instantaneous velocity, displacement distance, departure velocity, or geographical data, and wherein each of the instantaneous velocity, displacement distance, and departure velocity is mapped to at least one activity status and associated with at least one measurement score.

4. The method of claim 1, further comprising adjusting a sampling rate for each of the one or more sensors based on transitioning from the first location state to the second location state, wherein the sampling rate for each of the one or more sensors corresponds to a frequency of communication for receiving the location measurement.

5. The method of claim 1, wherein the second location state is associated with a second location different from a first location of the first location state, the method further comprising:

outputting, via a graphical user interface of the electronic device, one or both of the second location state or the second location.

6. The method of claim 1, wherein the first location state and the second location state each correspond to one of an unknown location state, an arrived state, a departure transition state, an enroute state, or an arrival transition state.

7. The method of claim 1, wherein the first location state is an unknown location state of the UE and the second location state is one of an arrived state of the UE or an enroute state of the UE.

8. The method of claim 1, wherein the first location state is an arrived state of the UE and the second location state is a departure transition state.

9. The method of claim 1, wherein the first location state is a departure state of the UE and the second location state is one of an unknown location state of the UE or an enroute state of the UE.

10. The method of claim 1, wherein the first location state is an enroute state of the UE and the second location state is one of an unknown location state of the UE or an arrival state of the UE.

11. The method of claim 1, wherein the first location state is an arrival transition state of the UE and the second location state is one of an unknown location state of the UE or an arrived state of the UE.

12. The method of claim 1, wherein the one or more sensors include a global positioning system (GPS) sensor, accelerometer, a gyrator, a compass, or a microelectromechanical (MEMS) sensor.

13. An electronic device for location determination, comprising:

a memory configured to store data and instructions;

at least one sensor configured to obtain one or more location measurements;

at least one processor in communication with the memory and the at least one sensor, wherein the at least one processor is configured to:

receive at least one of a location measurement from the at least one sensor or an activity status of the electronic device from the at least one application module;

determine a location state transition condition using one or both of the location measurement or the activity status of the electronic device, wherein the location state transition condition corresponds to a location score representing a confidence level of a location state of the electronic device and configured based on a history of location measurements or activity statuses, and wherein to determine the location state transition condition using one or both of the location measurement or the activity status of the electronic device, the at least one processor is further configured to:

obtain one or both of a measurement score associated with the location measurement or an activity score associated with the activity status;

determine one or both of a weighted measurement score or a weighted activity score as a function of at least one score weighing parameter and the measurement score or the activity score, respectively; and adjust the location score based on one or both of the weighted measurement score or the weighted activity score;

determine whether the location state transition condition satisfies a location state transition threshold triggering an entry or exit to or from a first location state;

transition from the first location state to a second location state different from the first location state based on a determination that the location state transition condition satisfies the location state transition threshold; and maintain the first location state based on a determination that the location state transition condition does not satisfy the location state transition threshold.

14. A non-transitory computer-readable medium storing instructions executable by an electronic device for location determination, comprising at least one instruction for causing the electronic device to:

receive at least one of a location measurement from at least one sensor or an activity status of the electronic device from the at least one application module;

determine a location state transition condition using one or both of the location measurement or the activity status of the electronic device, wherein the location state transition condition corresponds to a location score representing a confidence level of a location state of the electronic device and configured based on a history of location measurements or activity statuses, and wherein to determine the location state transition condition using one or both of the location measurement or the activity status of the electronic device, the at least one instruction further causing the electronic device to:
obtain one or both of a measurement score associated with the location measurement or an activity score associated with the activity status;
determine one or both of a weighted measurement score or a weighted activity score as a function of at least one score weighing parameter and the measurement score or the activity score, respectively; and
adjust the location score based on one or both of the weighted measurement score or the weighted activity score;

determine whether the location state transition condition satisfies a location state transition threshold triggering an entry or exit to or from a first location state;

transition from the first location state to a second location state different from the first location state based on a determination that the location state transition condition satisfies the location state transition threshold; and maintain the first location state based on a determination that the location state transition condition does not satisfy the location state transition threshold.

* * * * *